United States Patent
Futamura et al.

(10) Patent No.: US 9,415,718 B2
(45) Date of Patent: *Aug. 16, 2016

(54) VEHICULAR HEADLIGHT APPARATUS

(71) Applicant: DENSO CORPORATION, Kariya, Aichi-pref. (JP)

(72) Inventors: Shinichi Futamura, Kuwana (JP); Ryu Mizuno, Kariya (JP); Koichi Masuda, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,553

(22) Filed: Sep. 18, 2014

(65) Prior Publication Data

US 2015/0003087 A1 Jan. 1, 2015

Related U.S. Application Data

(63) Continuation-in-part of application No. 13/484,782, filed on May 31, 2012, now Pat. No. 8,866,387.

(30) Foreign Application Priority Data

Jun. 8, 2011 (JP) .................................. 2011-127864

(51) Int. Cl.
*B60Q 1/02* (2006.01)
*B60Q 1/08* (2006.01)
*B60Q 1/14* (2006.01)
*B60Q 9/00* (2006.01)

(52) U.S. Cl.
CPC ............. *B60Q 1/085* (2013.01); *B60Q 1/143* (2013.01); *B60Q 9/008* (2013.01); *B60Q 2300/056* (2013.01); *B60Q 2300/112* (2013.01); *B60Q 2300/122* (2013.01); *B60Q 2300/334* (2013.01); *B60Q 2300/41* (2013.01); *B60Q 2300/42* (2013.01); *B60Q 2300/45* (2013.01)

(58) Field of Classification Search
None
See application file for complete search history.

(56) References Cited

U.S. PATENT DOCUMENTS

| | | | |
|---|---|---|---|
| 5,707,129 A | 1/1998 | Kobayashi | |
| 5,877,680 A | 3/1999 | Okuchi et al. | |
| 8,866,387 B2 * | 10/2014 | Futamura et al. | ............... 315/82 |

(Continued)

FOREIGN PATENT DOCUMENTS

| | | |
|---|---|---|
| EP | 1028025 | 8/2000 |
| JP | 60-064044 | 4/1985 |

(Continued)

OTHER PUBLICATIONS

Office Action dated Apr. 18, 2013 in corresponding JP Application No. 2011-127864.

*Primary Examiner* — Anh Tran
(74) *Attorney, Agent, or Firm* — Harness, Dickey & Pierce, P.L.C.

(57) ABSTRACT

The vehicular headlight apparatus includes a control means configured to change a light illumination area following a position of a detected target object until a shift angle between a reference direction and a direction to the target object with respect to a headlight is calculated to exceed a maximum limit shift angle, and configured to, when a vehicle speed is detected to exceed a predetermined threshold value, set the maximum limit shift angle to a small deflection angle, and change the present light illumination area to a low-beam light illumination area covered by the headlight in a low-beam state if the shift angle is calculated to exceed the maximum limit shift angle set to the small deflection angle.

11 Claims, 15 Drawing Sheets

(56) References Cited

U.S. PATENT DOCUMENTS

| | | |
|---|---|---|
| 2006/0177098 A1* | 8/2006 | Stam .......................... 382/104 |
| 2008/0106886 A1 | 5/2008 | Sugimoto et al. |
| 2008/0130302 A1 | 6/2008 | Watanabe |
| 2008/0298077 A1 | 12/2008 | Naganawa et al. |
| 2009/0279317 A1 | 11/2009 | Tatara |
| 2011/0025209 A1 | 2/2011 | Nakanishi et al. |

FOREIGN PATENT DOCUMENTS

| | | |
|---|---|---|
| JP | 02-045235 | 2/1990 |
| JP | 06-275104 | 9/1994 |
| JP | 07-108874 | 4/1995 |
| JP | 10-166933 | 6/1998 |
| JP | 2000-229533 | 8/2000 |
| JP | 2003-159986 | 6/2003 |
| JP | 2006-021631 | 1/2006 |
| JP | 2008-110686 | 5/2008 |
| JP | 2008-137516 | 6/2008 |
| JP | 2009-269511 | 11/2009 |
| JP | 2009-269512 | 11/2009 |
| JP | 2010-111341 | 5/2010 |
| JP | 2011-031641 | 2/2011 |

* cited by examiner

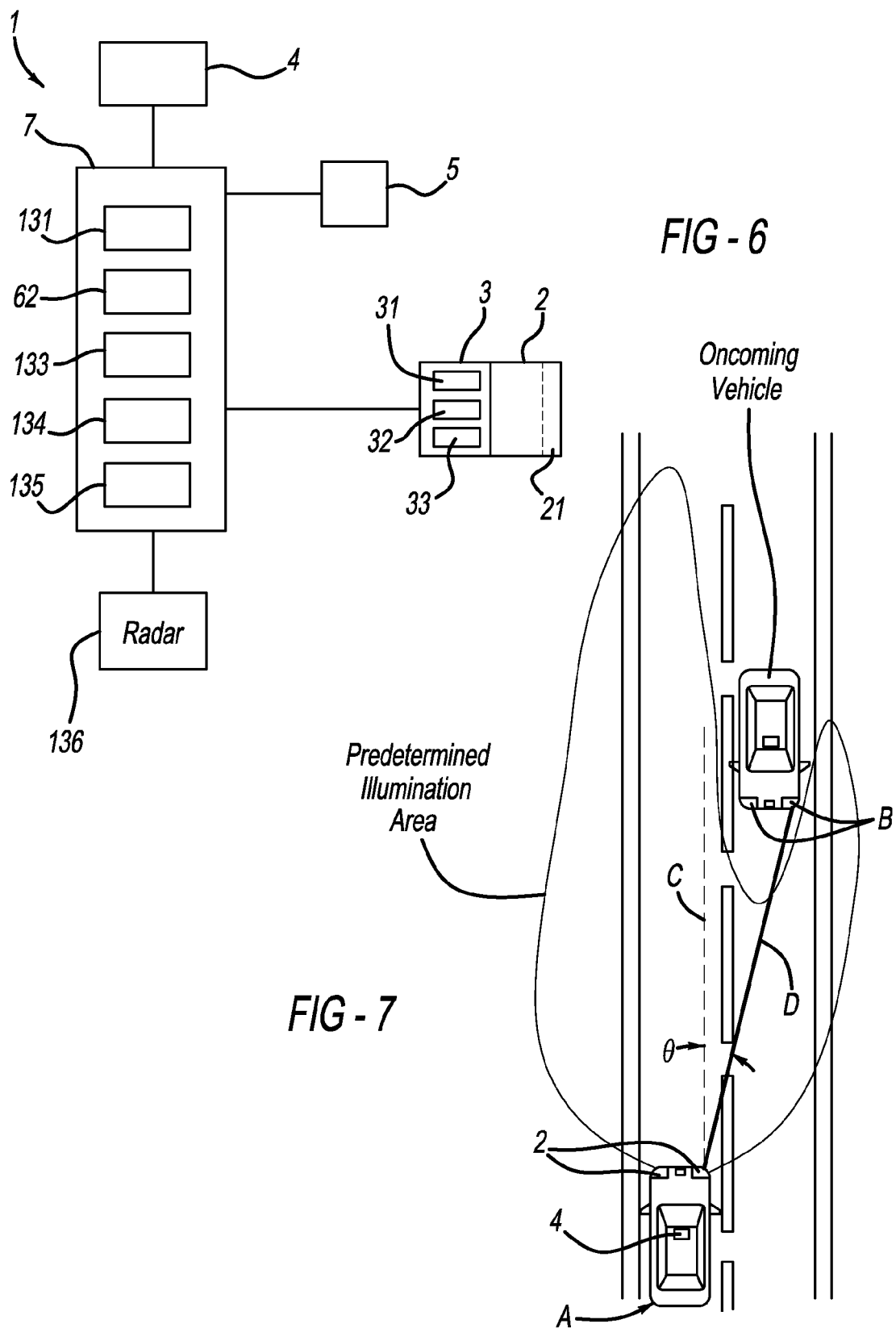

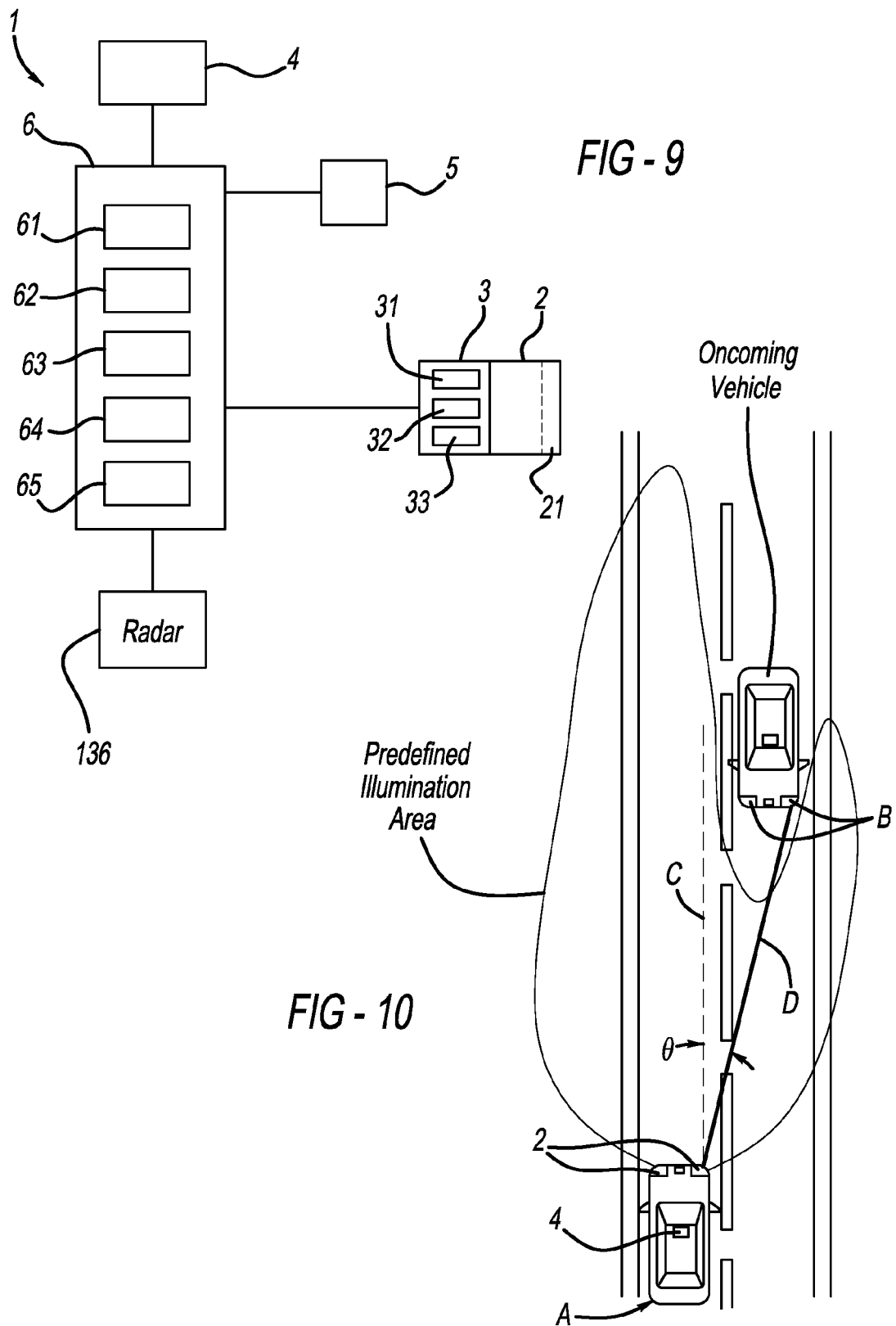

VEHICULAR HEADLIGHT APPARATUS

This application is a continuation-in-part of U.S. Ser. No. 13/484,782 filed May 31, 2012 and claims priority to Japanese Patent Application No. 2011-127864 filed on Jun. 8, 2011, the entire contents of which are hereby incorporated by reference.

BACKGROUND OF THE INVENTION

1. Field of the Invention

The present disclosure relates to a vehicular headlight apparatus.

2. Description of Related Art

There is known a vehicular headlight apparatus configured to control a light distribution pattern of headlights in order that a light illumination area proper for a target object is illuminated by the light emitted from the headlights. For example, refer to Japanese Patent Application Laid-open No. 2006-21631. In such a vehicular headlight apparatus, a light illumination area is determined uniquely by a light distribution pattern. That is, controlling a light distribution pattern means controlling a light illumination area.

When a target object is detected by an object recognition means such as a camera, the above vehicular headlight apparatus changes the present light distribution pattern so that the light emitted from the headlights covers a light illumination area set for the detected target object. For example, when an oncoming vehicle is detected in the high-beam state (the state in which the headlights of the vehicle on which the vehicular headlight apparatus is mounted are in the high-beam state) or the intermediate-beam state (the state in which the headlights are between the high-beam state and the low-beam state), the vehicular headlight apparatus changes the present light distribution pattern so that the present light illumination area excluding an area near the detected vehicle is illuminated. This makes it possible to illuminate to a sufficient distance without dazzling the driver of the oncoming or preceding vehicle.

In the above vehicular headlight apparatus, the light illumination area is changed depending on the position of an oncoming vehicle. That is, the light illumination area is changed so as to follow an oncoming vehicle. Changing of the light illumination area of the headlights is made using swivel motors or the like.

However, the above vehicular headlight apparatus has a problem in that it may occur that the light illumination area cannot be changed quickly enough following change of the position of a target object when the vehicle is running at a high speed on an express way, or when the vehicle is turning sharply. In this case, the light illumination area may deviate from an intended area, causing a problem that the vehicle driver of an oncoming vehicle is dazzled.

SUMMARY

An exemplary embodiment provides a vehicular headlight apparatus including:
a headlight for illuminating ahead of a vehicle;
a changing means for changing a light illumination area of the headlight;
a recognition means for recognizing an object present ahead of the vehicle;
an analyzing means for detecting a target object belonging to one of predetermined categories, and calculating positions of the target object in a vertical direction and in a lateral direction;
a control means for controlling the changing means;
a reference direction determining means for determining a reference direction with respect to a direction of light emission of the headlight when the target object is detected;
a shift angle calculating means for calculating, as a shift angle, an angle between the reference direction and a direction to the target object with respect to the headlight;
a first storage means for storing a maximum deflection angle as a maximum limit shift angle; and
the control section being configured to change the light illumination area following a position of the target object until the shift angle exceeds the maximum limit shift angle;
wherein
the vehicular headlight apparatus further comprises:
a vehicle speed detecting means for detecting a speed of the vehicle; and
a second storage means for storing a small deflection angle smaller than the maximum deflection angle,
the control means being configured to, when the vehicle speed is detected to exceed a predetermined threshold value, set the maximum limit shift angle to the small deflection angle, and change the present light illumination area to a low-beam light illumination area covered by the headlight in a low-beam state if the calculated shift angle is calculated to exceed the maximum limit shift angle set to the small deflection angle.

According to the exemplary embodiment, there is provided a vehicular headlight apparatus capable of changing an illumination area of headlights following a detected target object without causing dazzling to a driver of the detected target object due to delay of a following operation of the headlights.

Other advantages and features of the invention will become apparent from the following description including the drawings and claims.

BRIEF DESCRIPTION OF THE DRAWINGS

In the accompanying drawings:

FIG. 6 is a diagram showing the structure of a vehicular headlight apparatus according to another embodiment of the present invention;

FIG. 7 is a diagram schematically explaining a light illumination area set by the vehicular headlight apparatus according to the embodiment illustrated in FIG. 6;

FIG. 9 is a diagram showing the structure of a vehicular headlight apparatus according to another embodiment of the present invention;

FIG. 10 is a diagram schematically explaining a light illumination area set by the vehicular headlight apparatus according to the embodiment illustrated in FIG. 9;

PREFERRED EMBODIMENTS OF THE INVENTION

First Embodiment

Figure 1:
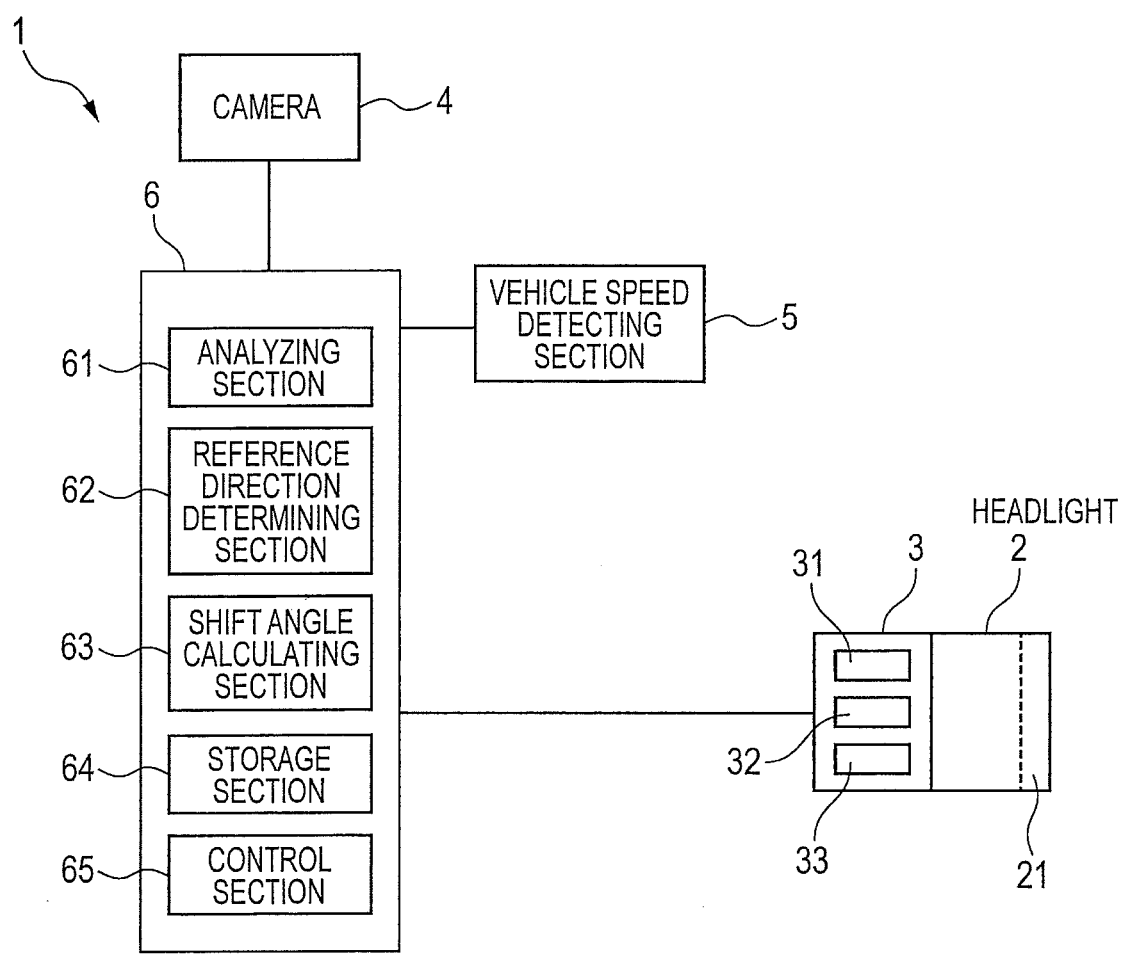
FIG. 1 is a diagram showing the structure of a vehicular headlight apparatus according to an embodiment of the invention.

As shown in FIG. 1, the vehicular headlight apparatus 1 according to a first embodiment of the invention includes headlights 2, a light distribution changing section 3, a camera 4, a vehicle speed detecting section 5, and an ECU (Electronic Control Unit) 6.

Each headlight 2 includes a light source (not shown), a reflector (not shown) and a slit-plate 21. The headlights 2 are mounted on the front left portion and the front right portion of a vehicle, respectively. The slit-plate 21 is disposed in the front of each headlight 2.

The light distribution changing section 3 provided in each headlight 2 includes a driver motor 31, a leveling motor 32 and a swivel motor 33. The drive motor 31 drives the slit-plate 21 in accordance with a command received from the ECU 6. The leveling motor 32 changes the light axis of the headlight 2 in the up-down direction in accordance with a command received from the ECU 6. The swivel motor 33 changes the optical axis of the headlight 2 in the left-right direction in accordance with a command received from the ECU 6.

A part of the light source of the headlight 2 at which it is covered by the slit-plate 21 is determined depending on the position of the slit-plate 21. By partially covering the light source, it is possible to form a dark part (shadow) in a light illumination area. A light distribution pattern is determined in accordance with the angles of the light axis in the up-down and left-right directions, and the position of the slit-plate 21 of each of the headlights 2. A light illumination area is determined in accordance with a light distribution pattern. In this embodiment, to change the present light illumination area, the light distribution changing section 3 drives the light axis of the light source and the slit-plate 21 for each of the headlights 2 to change the light distribution pattern.

Figure 2:
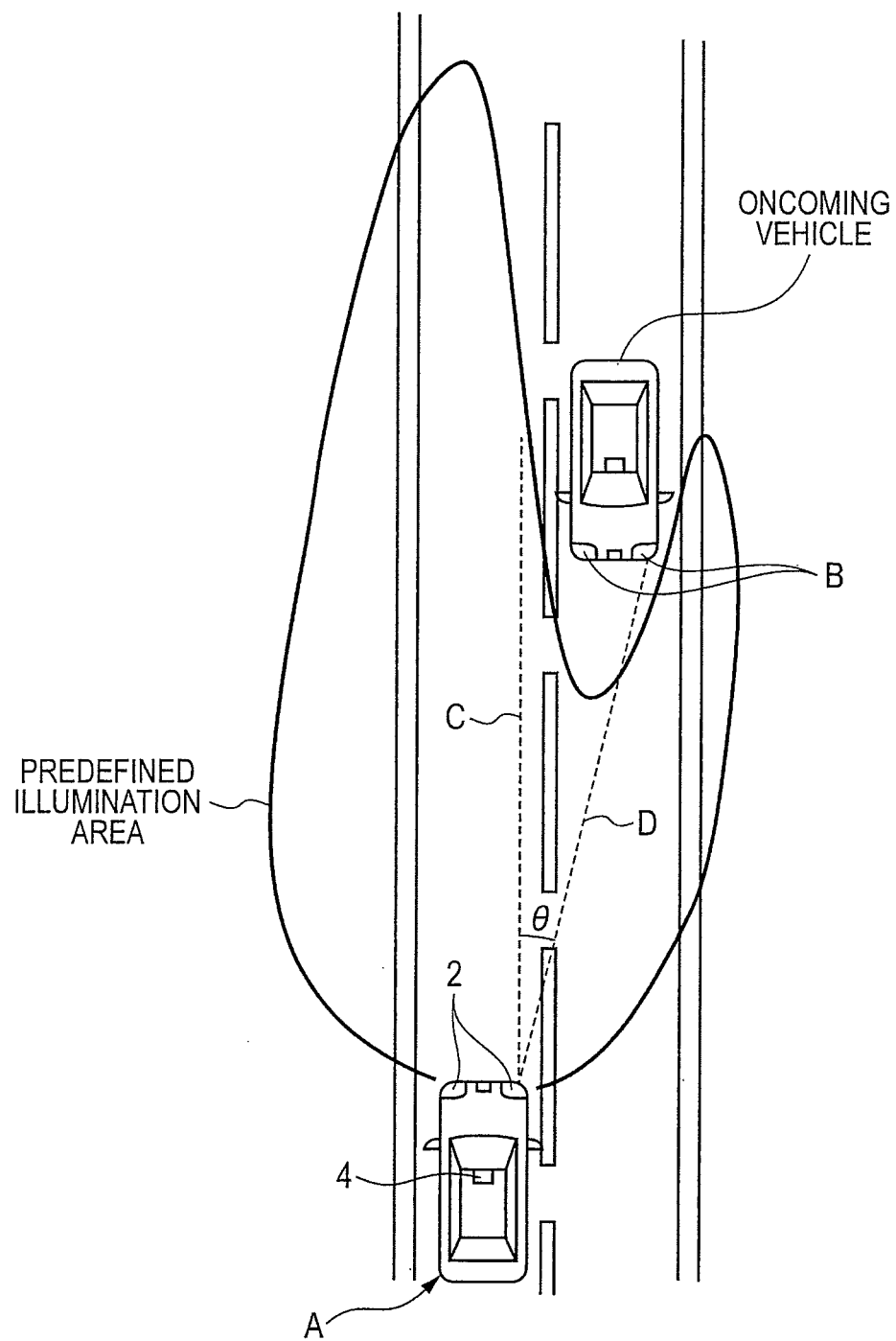
FIG. 2 is a diagram schematically explaining a light illumination area set by the vehicular headlight apparatus according to the embodiment illustrated in FIG. 1.

The cameral 4 as an image sensor takes an image ahead of the vehicle. An infrared ray is used for taking an image of a pedestrian or the like. As shown in FIG. 2, the camera 4 is mounted on the vehicle. The camera 4 transmits image data of a taken image to the ECU 6.

The vehicle speed detecting section 5, which is a vehicle wheel speed sensor, detects the vehicle speed. The vehicle speed detecting section 5 transmits data indicative of the detected vehicle speed to the ECU 6.

The ECU 6 is a microcomputer-based electronic control unit for controlling the light distributing changing section 3. Functionally, the ECU 6 includes an analyzing section 61, a reference direction determining section 62, a shift angle calculating section 63, a storage section 64, and a control section 65.

The analyzing section 61 is for analyzing image data transmitted from the camera 4. More specifically, the analyzing section 61 detects a target object B such as a headlight of an oncoming vehicle, and calculates the positions of the target object B in each of the vertical direction (up-down direction) and the lateral direction (left-right direction) based on the image data transmitted from the camera 4. The analyzing section 61 may be incorporated in the camera 4.

The reference direction determining section 62 determines a reference direction based on the direction of illumination of the headlights 2 when the target object B is detected. More specifically, the reference direction determining section 62 determines the reference direction based on the vehicle speed and the steering angle of the vehicle when the target object B is detected. For example, in a case where the target object B is not yet detected, and the vehicle is running straight, since the direction of illumination is approximately perpendicular to the front of the vehicle (more precisely, slightly inwardly), a direction approximately perpendicular to the front of the vehicle is determined as the reference direction (see the broken line C in FIG. 2).

The shift angle calculating section 63 calculates, as a shift angle theta, an angle from the reference direction to the direction to the target object B in the clockwise direction (in the outward direction). More specifically, the shift angle theta is an angle which the broken line C parallel to the reference direction and passing through the headlight 2 (the right side headlight in FIG. 2) makes a broken line D passing through the headlight 2 (the right side headlight in FIG. 2) and the target object B (the left side headlight of an oncoming vehicle). When the target object B is a headlight of an oncoming vehicle, the shift angle theta is calculated with respect to one of the headlights 2 on the side of the oncoming vehicle, that is, the left side headlight 2 in the case of left-hand traffic, and the right side headlight 2 in the case of right-hand traffic. The shift angle theta increases as the target object B approaches the vehicle on which vehicular headlight apparatus 1 is mounted (may be referred to as the vehicle A hereinafter).

The storage section 64, which is constituted of a ROM or the like, stores a maximum deflection angle, a small deflection angle, and a following-operation start range. The maximum deflection angle is an angle value which is set as a later-explained maximum limit shift angle until which the operation to follow the detected target object B is performed. In this embodiment, the maximum deflection angle is set to 5 degrees in the clockwise direction for the right side headlight 2, and to 10 degrees in the counter clockwise direction for the left side headlight 2 (for following a preceding vehicle). The small deflection angle, which is smaller than the maximum deflection angle, is set for at least one of the headlights 2 on the side of the target object B (that is, on the right side headlight 2). In this embodiment, the small deflection angle is set to 2 degrees for the right side headlight 2.

The following-operation start range is such an angle range that if the shift angle theta is within the following operation-start range when the target object B is detected, a following operation (light illumination to a predefined light illumination area) is started. In this embodiment, the maximum value of the following-operation start range is set to the maximum limit shift angle (the maximum deflection angle or the small deflection angle) at the moment when the target object B is detected. In this embodiment, the following-operation start range is an angular range from a predetermined angle slightly smaller than 5 degrees to 5 degrees, or an angular range from a predetermined angle slightly smaller than 2 degrees to 2 degrees.

The control section 65 has a function of controlling the light distribution changing section 3. When the target object B is detected by the analyzing section 61, the control section 65 makes a change from a high-beam illumination area (the illumination area covered by the headlights 2 in the high-beam state) to the predefined light illumination area based on results of the analysis by the analyzing section 61. The predefined light illumination area is a light illumination area (light distribution pattern) set in advance for each of kinds of target objects. Accordingly, the predefined light illumination area is an area to be tracked in accordance with the position of a detected target object.

For example, when the target object B is an headlight of an oncoming vehicle, the predefined light illumination area is the present light illumination area excluding an area near the oncoming vehicle. The position of the area to be excluded changes in accordance with movement of the target object B.

Next, an operation of the ECU 6 is explained with reference to the flowchart of FIG. 3. First, the analyzing section 61 detects a target object B in step S1. Subsequently, the reference direction determining section 62 determines the reference direction, and the shift angle calculating section 63 calculates the shift angle theta in step S2. The control section 65 calculates the predefined light illumination area based on results of analysis by the analyzing section 61.

Subsequently, it is determined whether or not the vehicle speed detected by the vehicle speed detecting section 5 is larger than a predetermined threshold (80 km/h, for example) in step S4. If the determination result in step S4 is affirmative, the operation proceeds to step S5 where the control section 65 sets the maximum limit shift angle to the small deflection angle. If the determination result in step S4 is negative, the operation proceeds to step S6 where the control section 65 sets the maximum limit shift angle to the maximum deflection angle. In this embodiment, since the maximum limit shift angle and the maximum value of the following-operation start range are the same with each other, the maximum value of the following-operation start range is determined at the same time when the maximum limit shift angle is set.

Subsequently, the control section 65 determines whether or not the shift angle theta calculated by the shift angle calculating section 63 is smaller than or equal to the maximum limit shift angle (which is the maximum deflection angle or the small deflection angle) in step S7. If the determination result in step S7 is affirmative, the operation proceeds to step S8 where the predefined light illumination area is set as the present light illumination area. If the determination result in step S7 is negative, the operation proceeds to step S9 where the low-beam light illumination area is set as the present light illumination area. Step S2 may be performed at the time of performing step S7.

According to the first embodiment, the maximum limit shift angle is decreased by being set to the small deflection angle when the target object B is detected while the vehicle A runs at a high speed on an express way. This makes it possible to make a change to the low-beam state before delay occurs in swivel operation of the headlights. For example, if the vehicular headlight apparatus 1 detects an oncoming vehicle when the vehicle A is running in the high-beam state on an express way, the swivel operation is performed in the intermediate-beam state to illuminate the predefined light illumination area until the oncoming vehicle substantially approaches the vehicle A, and a change from the intermediate-beam state to the low-beam state is made earlier than when the vehicle A is running at a low or intermediate speed. Accordingly, according to the first embodiment configured to decrease the maximum limit shift angle when the vehicle is running at a high speed, it is possible to prevent dazzling of the driver of the target object B due to delay of the swivel operation of the headlights.

Second Embodiment

Figure 4:
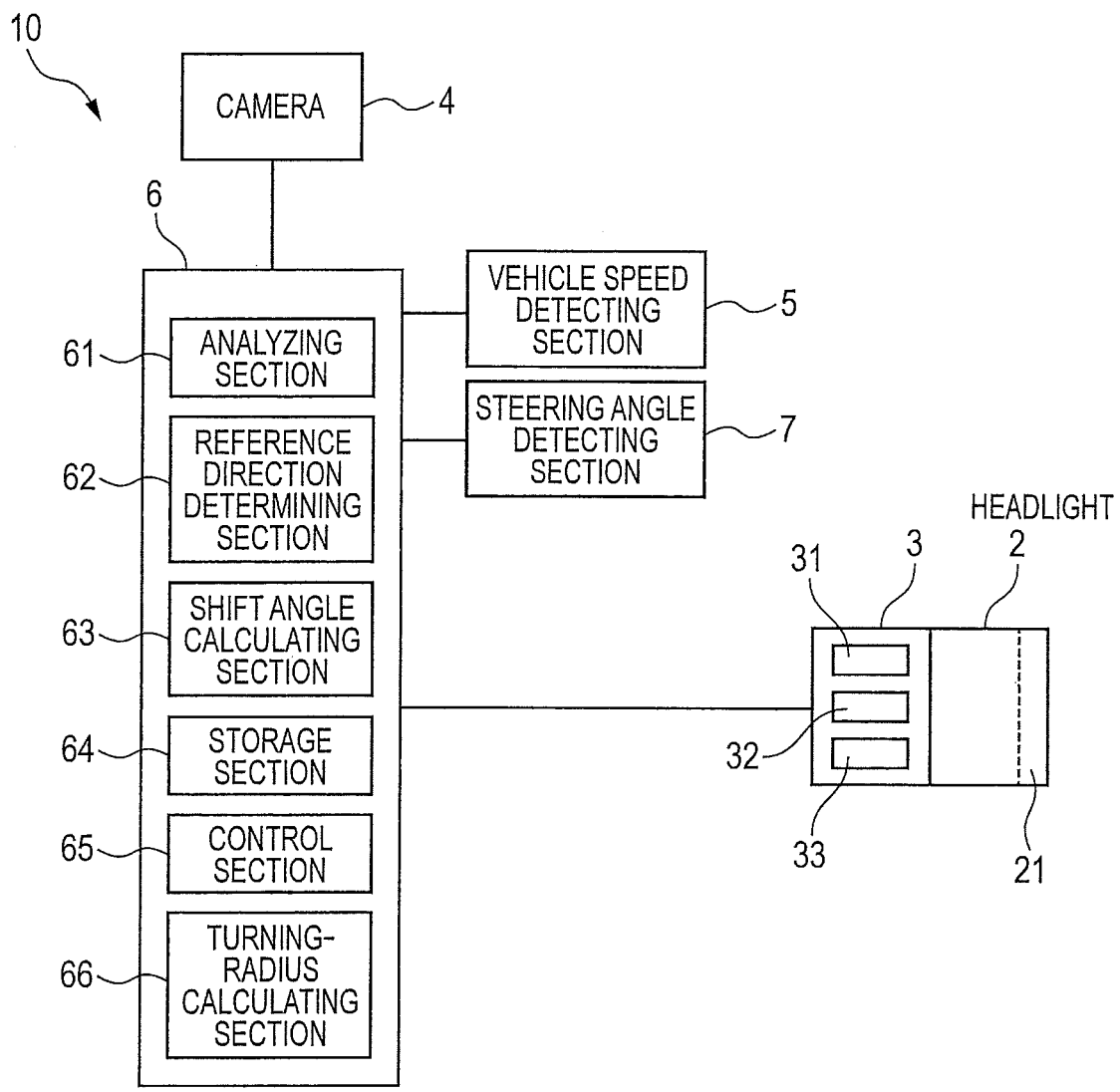
FIG. 4 is a diagram showing the structure of a vehicular headlight apparatus according to another embodiment of the present disclosure.

Next, a vehicular headlight apparatus 10 according to a second embodiment of the invention is described. As shown in FIG. 4, the vehicular headlight apparatus 10 includes a steering angle detecting section 7 in addition to the components included in the vehicular headlight apparatus 1 according to the first embodiment. Further, in the second embodiment, the ECU 6 includes a turning radius calculating section 66.

The steering angle detecting section 7, which is for detecting the steering angle of the vehicle, is constituted of a steering sensor. The steering angle detecting section 7 transmits data indicative of the detected steering angle to the ECU 6. The turning radius calculating section 66 calculates the turning radius of the vehicle based on detection results received from the vehicle speed detecting section 5 and the steering angle detecting section 7.

Figure 3:
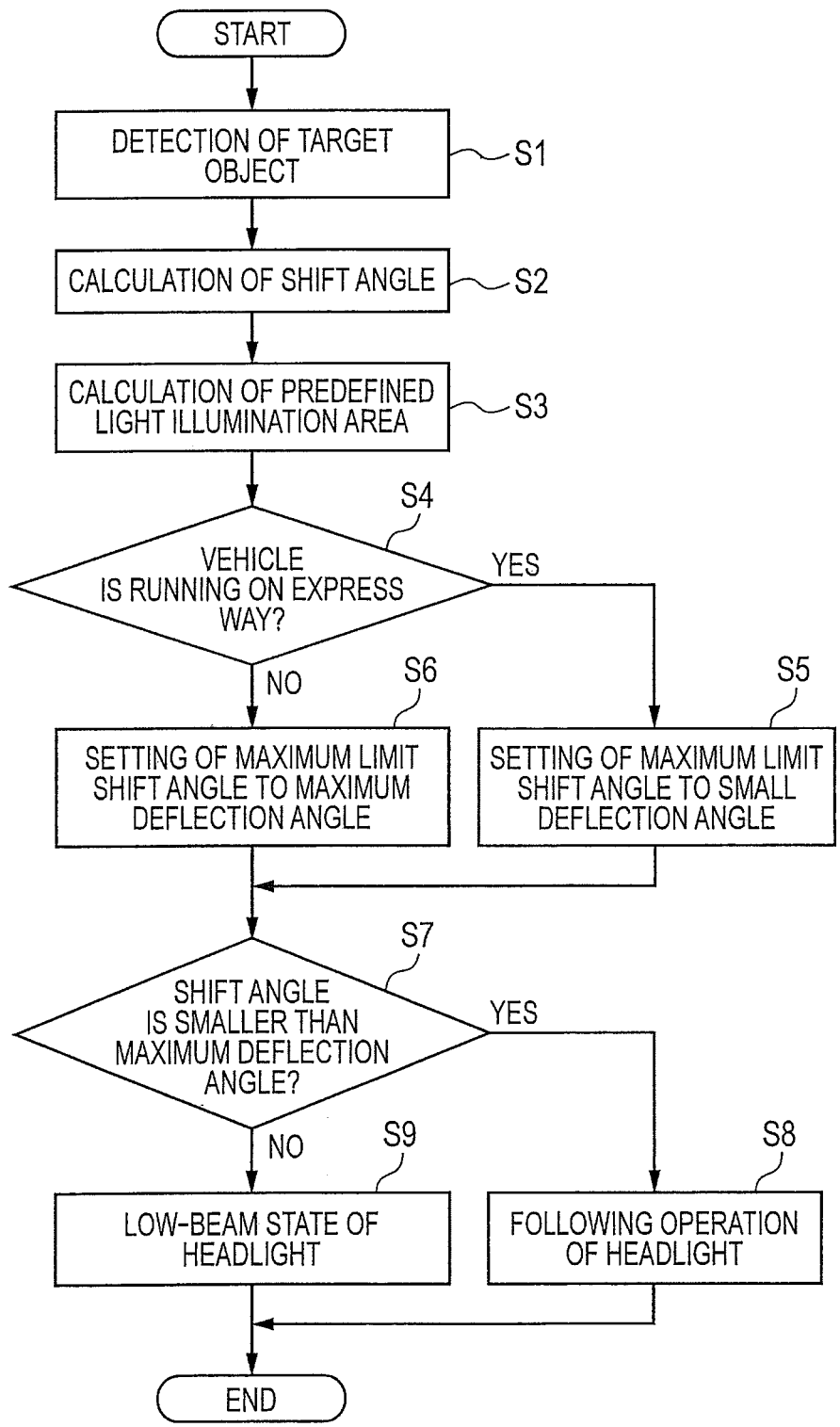
FIG. 3 is a flowchart showing an operation of the vehicular headlight apparatus according to the embodiment illustrated in FIG. 1.

The control section 65 includes, in addition to the operation flow shown in FIG. 3, an operation flow which is the same as the operation flow shown in FIG. 3 except that the content of step S4 is for determining whether or not the turning radius is smaller than a predetermined threshold. In the second embodiment, if the determination result in step S4 is affirmative, that is, if the turning radius is smaller than the predetermined threshold, the maximum limit shift angle is set to the small deflection angle. On the other hand, if the determination result in step S4 is negative, that is, if the turning radius is larger than or equal to the predetermined threshold, the maximum limit shift angle is set to the maximum deflection angle.

According to the second embodiment configured to decrease the maximum limit shift angle when the turning radius of the vehicle is small, it is possible to prevent dazzling of the driver of the target object B due to delay of the swivel operation of the headlights when the vehicle turns sharply, because a change to the low-beam state is made earlier.

Third Embodiment

Next, a third embodiment of the invention is described. The third embodiment differs from the first embodiment in that the maximum value of the following-operation start range is set to a value smaller than the small deflection angle. For example, in the third embodiment, the maximum deflection angle is set to 5 degrees, the small deflection angle is set to 4 degrees, and the following-operation start range is set to the range from the predetermined angle slightly smaller than 2 degrees to 2 degrees. Further, in the third embodiment, the following-operation start range is set differently between when the vehicle is running at a high speed and when the vehicle speed is running at an intermediate speed or a low speed. That is, in the third embodiment, the following-operation start range is set to a high-speed following-operation start range when the vehicle is running at a high speed, and set to an intermediate/low-speed following-operation start range when the vehicle is running at an intermediate speed or a low speed. The maximum value of the high-speed following-operation start range is set smaller than the maximum value of the intermediate/low-speed following-operation start range. For example, the maximum value of the high-speed following-operation start range is set to approximately half the small deflection angle, and the maximum value of the intermediate/low-speed following-operation start range is set to approximately half the maximum deflection angle.

Figure 5:
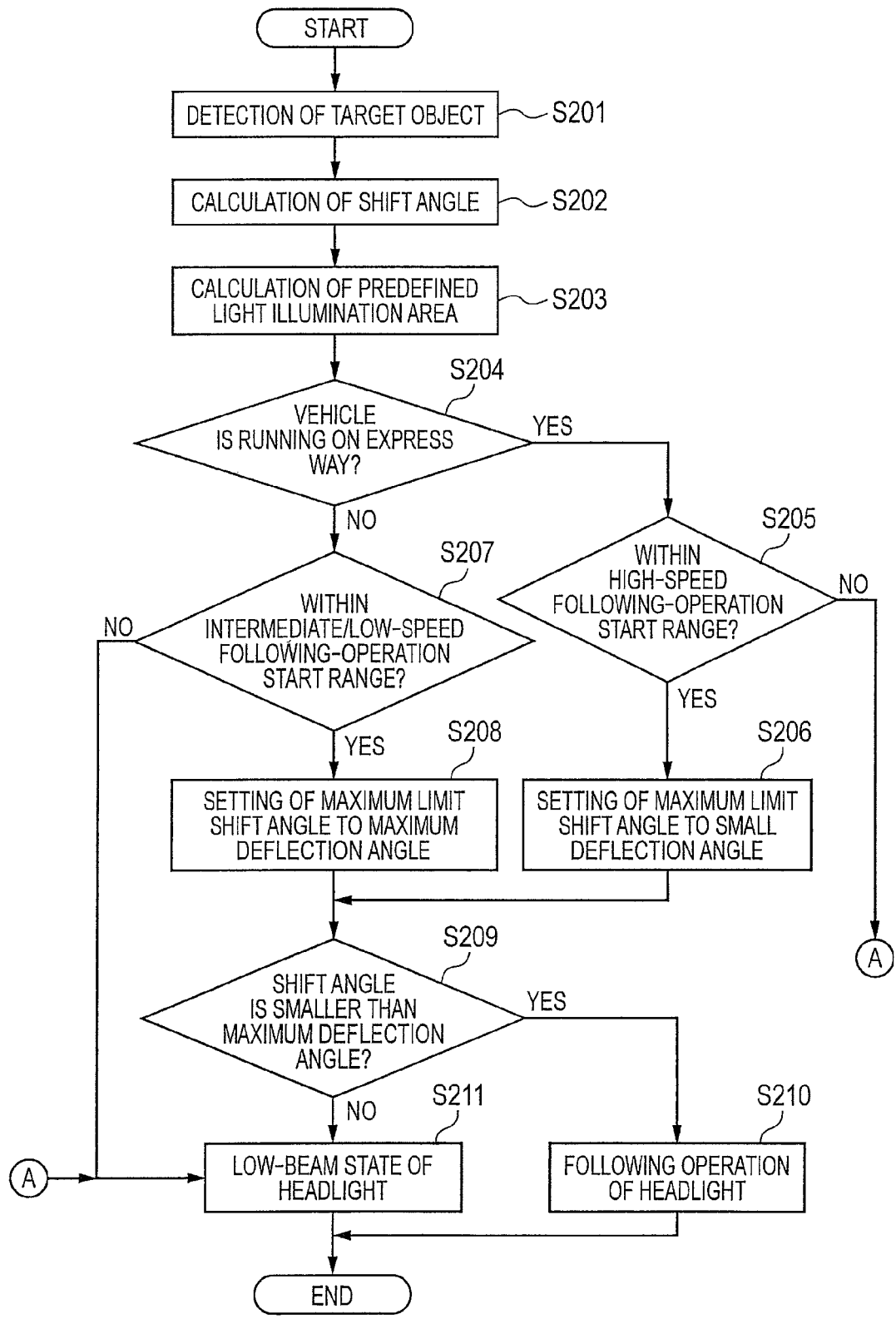
FIG. 5 is a flowchart showing an operation of a vehicular headlight apparatus according to another embodiment of the present disclosure.

Next, an operation of the ECU 6 in the third embodiment is explained with reference to the flowchart of FIG. 5.

Like the first embodiment, a target object B is detected in step S202, the shift angle is calculated in step S202, and the predefined light illumination area is calculated in step S203. Subsequently, it is determined whether or not the vehicle speed is larger than a predetermined value (80 km/h, for example) in step S204. If the determination result in step S204 is affirmative, it is determined whether or not the shift angle is within the high-speed following-operation start range in step S205. This is because, in the third embodiment, the maximum value of the following-operation start range is different from the maximum limit shift angle.

If the determination result in step S205 is affirmative, the maximum limit shift angle is set to the small deflection angle in step S206. If the determination result in step S205 is negative, the present light illumination area is changed to the low-beam light illumination area in step S211.

If the determination result in step S204 is negative, it is determined whether or not the shift angle is within the intermediate/low-speed following-operation start range in step S207. If the determination result in step S207 is affirmative, the maximum limit shift angle is set to the maximum deflection angle in step S208. If the determination result in step S207 is negative, the present light illumination area is changed to the low-beam light illumination area in step S211.

After completion of step S206 or S208, it is determined whether or not the shift angle is smaller than or equal to the maximum limit shift angle in step S209. If the determination result in step S209 is affirmative, the following operation is continued in step S210. If the determination result in step S209 is negative, the present light illumination area is changed to the low-beam light illumination area in step S211.

If the shift angle is within the following-operation start range when the target object B is detected, the third embodiment operates in the same way as the first embodiment. If the shift angle is outside the following-operation start range when the target object B is detected, the present light illumination area is changed to the low-beam light illumination area regardless of the value of the maximum limit shift angle.

In the case where the maximum limit shift angle and the maximum value of the following-operation start range are the same with each other, if the following operation is started while an oncoming vehicle (target object B) is approaching, this maximum limits shift angle is reached immediately thereafter, and a change to the low-beam state is made. That is, in this case, changes from the high-beam state to the intermediate-beam state, and from the intermediate-beam state to the low-beam state are made during a short time period. Such frequent changes of the beam state of the headlights in a short time period may cause the vehicle driver of the vehicle to feel worsening of visibility. When the vehicle is running at a high speed, such frequent changes are made in a further shorter time period.

In the third embodiment, when an oncoming vehicle is detected within a short distance from the vehicle (outside the following-operation start range), a change from the high-beam state to the low-beam state without passing through the intermediate-beam state is made, and when an oncoming vehicle is detected away from the vehicle (within the following-operation start range), a change from the high-beam state to the low-beam state through the intermediate-beam state is made. According to the third embodiment, it is possible to make a change from the high-beam state to the low-beam state without passing through the intermediate-beam state when the target object B is detected with the shift angle being (3 degrees, for example) between the maximum value (2-2.5 degrees, for example) of the following-operation start range and the small deflection angle (4 degrees, for example).

Hence, according to the third embodiment, it is possible to prevent that the present light illumination area is changed frequently in a short time when a target object is detected within a short distance from the vehicle, because the change is made without passing through the intermediate-beam state. In addition, the third embodiment provides, in addition to the advantages provided by the first embodiment, the advantage that the vehicle driver is provided with good visibility.

The following-operation start range may be one in number. In this case, a step for determining whether or not the shift angle is within the following-operation start range is added between step S203 and step S204, and if the determined result in this added step is affirmative, the operation proceeds to step S204, and otherwise proceeds to step S211. Accordingly, in this case, steps S205 and S207 are unnecessary. Alternatively, in this case, the operation flow may be modified such that the following operation of the headlights is started when the shift angle is detected to be within the following-operation start angle in the added step, step S205 or step S207.

Figure 8:
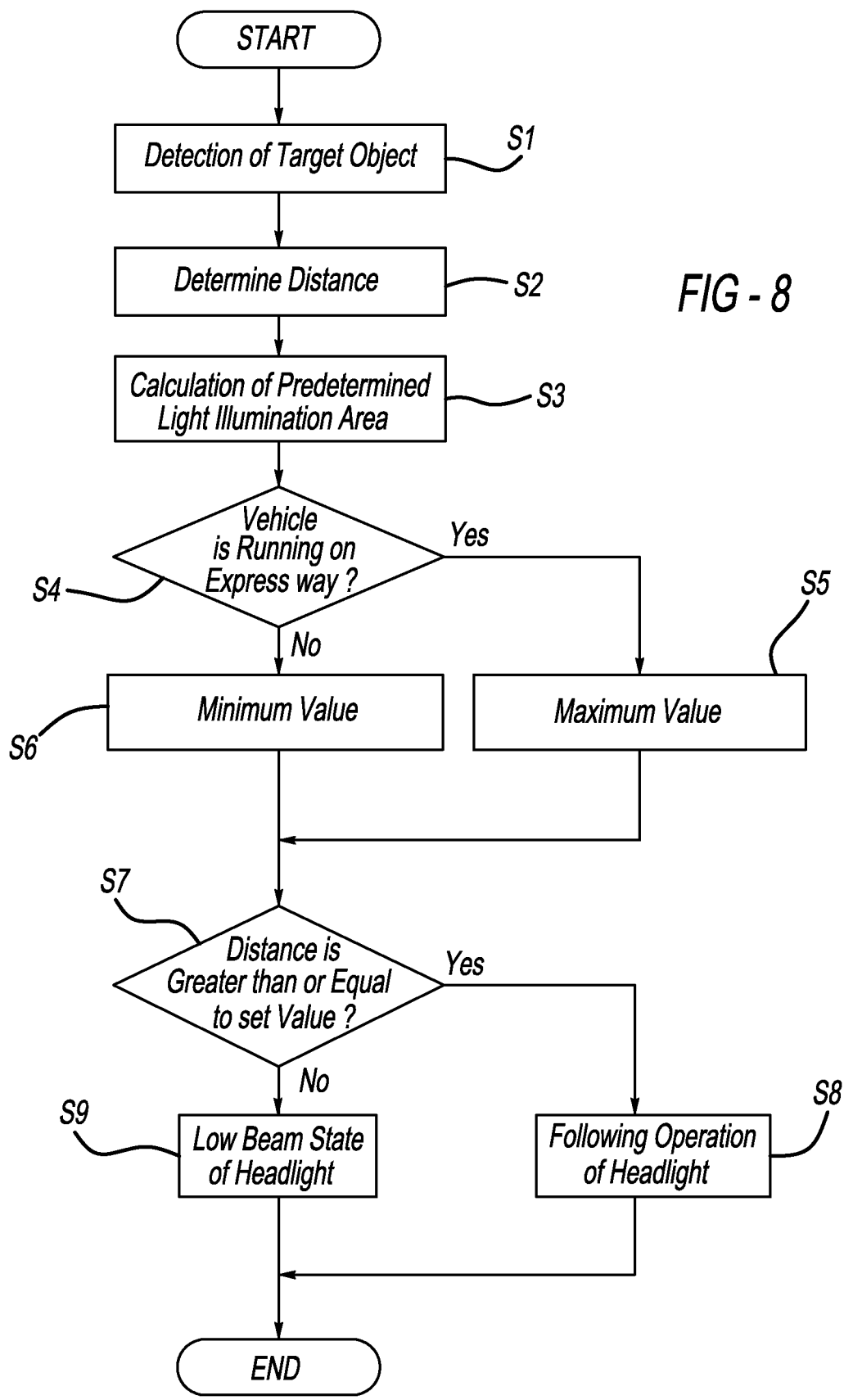
FIG. 8 is a flowchart showing an operation of the vehicular headlight apparatus according to the embodiment illustrated in FIG. 6.

The vehicular headlight apparatus, illustrated in FIG. 6-8, is designed to use a distance threshold value in changing the light illumination area.

The ECU 7 also includes, as illustrated in FIG. 6, an analyzing section 131, an inter-vehicle distance section 133 (including a calculation section), a storage section 134, and a control section 135. The inter-vehicle distance section 133 is used instead of the shift angle calculating section 62 in FIG. 1. The inter-vehicle distance section 133 works to analyze an image, as captured by the camera 4, and calculate a position (i.e., coordinates) of a light(s) of an oncoming vehicle within the captured image (i.e., a coordinate system) to determine a distance (i.e., an inter-vehicle distance) between the vehicle A equipped with the headlight apparatus and the oncoming vehicle traveling ahead. The distance may alternatively be determined as a function of an interval between right and left headlights of the oncoming vehicle within the captured image or a distance to the oncoming vehicle, as derived by a radar 136.

The ECU 7 performs a program, as illustrated in FIG. 8. Only steps S2, S6, S5, and S7 are different in operation from the ones in FIG. 3.

In step S2, the inter-vehicle distance section 133 calculates the distance to the oncoming vehicle based on analysis results of the analyzing section 131 (e.g., the interval between the right and left headlights of the oncoming vehicle). An output of the vehicle speed detecting section 5 is analyzed in step S4. If the vehicle A is determined not to be running at high speeds, the routine proceeds to step S6 wherein the threshold value for the distance to the oncoming vehicle is set to a minimum value. Alternatively, if the vehicle A is determined to be running at high speeds, the routine proceeds to step S5 wherein the threshold value for the distance to the oncoming vehicle is set to a maximum value greater than the minimum value. In step S7, it is determined whether the distance to the oncoming vehicle is greater than or equal to the value, as set in either of step S5 or S6. If the distance to the oncoming vehicle is determined to be smaller than the value set in step S5 or S6, the low beam is selected.

The system is designed to accelerate switching to the low beam when the speed of the vehicle is high, thereby reducing the dazzling to the target object (i.e., an oncoming vehicle) which arises from a delay in making the light illumination area follow the target object when the relative speed of the vehicle to the target object becomes high.

The system is designed to change the light illumination area to the low-beam light illumination area when the distance to the target object is lower than the threshold distance.

Figure 11:
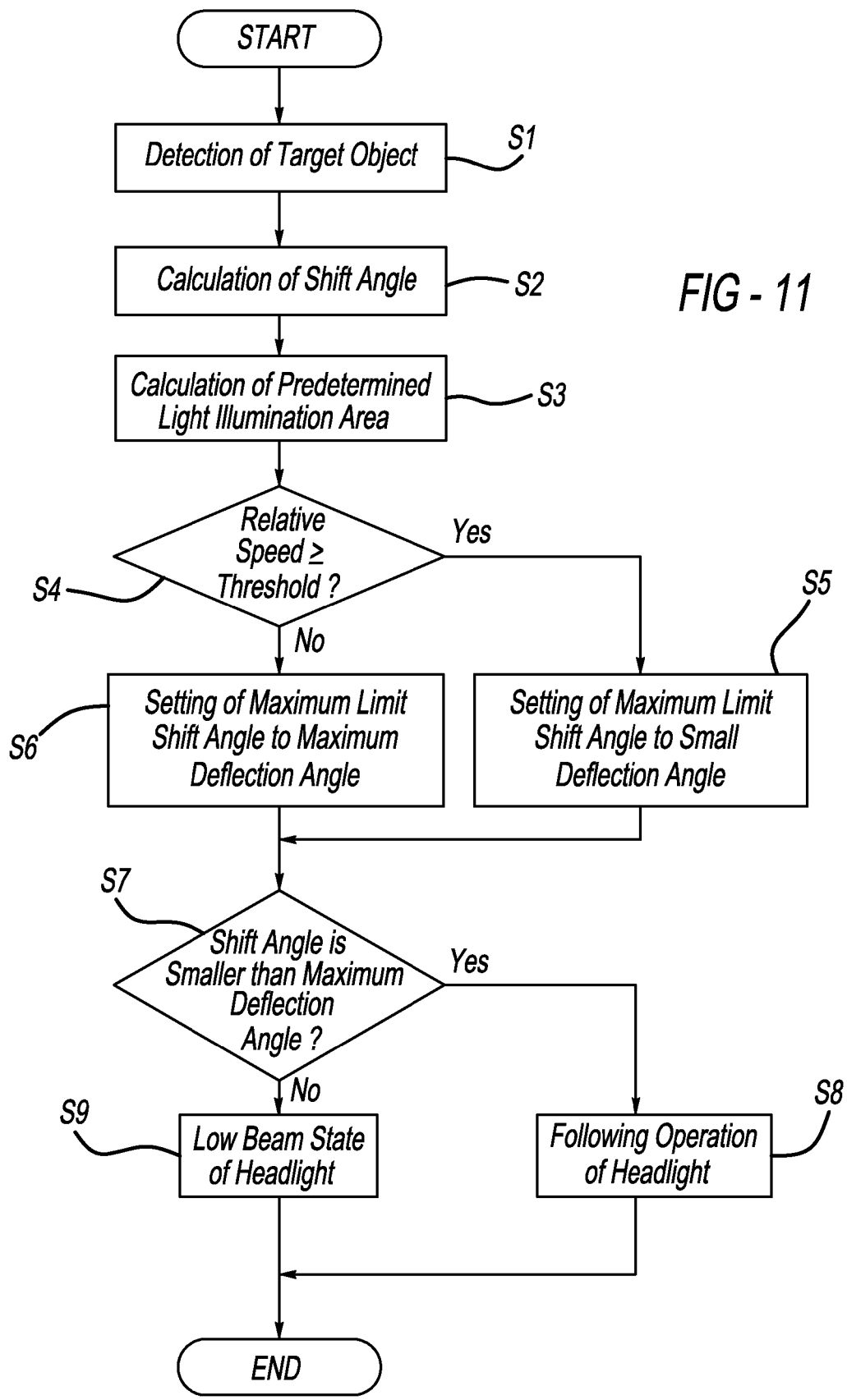
FIG. 11 is a flowchart showing an operation of the vehicular headlight apparatus according to the embodiment illustrated in FIG. 9.

The vehicular headlight apparatus illustrated in FIGS. 9-11 is designed to use a relative speed between the vehicle A and an oncoming vehicle.

The ECU 6 works to calculate the relative speed of the target object. For instance, the ECU 6 analyses an image, as captured by the camera 4, and calculate a change in interval between right and left headlights of the oncoming vehicle within the captured image to determine the relative speed. The relative speed may alternatively be determined using a radar 136.

The ECU 6 performs a program, as illustrated in FIG. 11. Only step S4 is different in operation from the one in FIG. 3.

In step S4, it is determined whether the relative speed of the target object is greater than or equal to a given threshold value or not, that is whether the possibility that the target object is an oncoming vehicle is high or not. For instance, when the speed of the vehicle A is 80 km/h, and the relative speed of the target object is 160 km/h or more, the ECU 6 determines that the possibility that the target object is the oncoming vehicle is determined to be high. If a YES answer is obtained meaning that the relative speed is high, the routine proceeds to step S5. Alternatively, if a NO answer is obtained meaning that the relative speed is low, the routine proceeds to step S6. When the shift angle is greater than or equal to the maximum limit shift angle (which is the maximum deflection angle or the small deflation angle), the low beam is selected in step S9.

Instead of the shift angle, a parameter indicating the distance to the target object may be used. In this case, when the relative speed is determined to be high, the ECU 6 may work to increase the threshold value for the distance to the target object to be greater than that when the relative speed is low. When the distance to the target object is less than a given threshold value, the ECU 6 may select the low beam mode.

The system is designed to narrow the light illumination area when the relative speed between the vehicle and the target object becomes high, thereby reducing the dazzling to the target object (i.e., an oncoming vehicle) which arises from a delay in making the light illumination area follow the target object when the speed of the target object becomes high.

The system works to switch a beam mode of the headlight to the low beam mode to narrow the light illumination area earlier than usual, thereby reducing the dazzling to the target object (i.e., an oncoming vehicle) which arises from a delay in making the light illumination area follow the target object.

Figure 12:
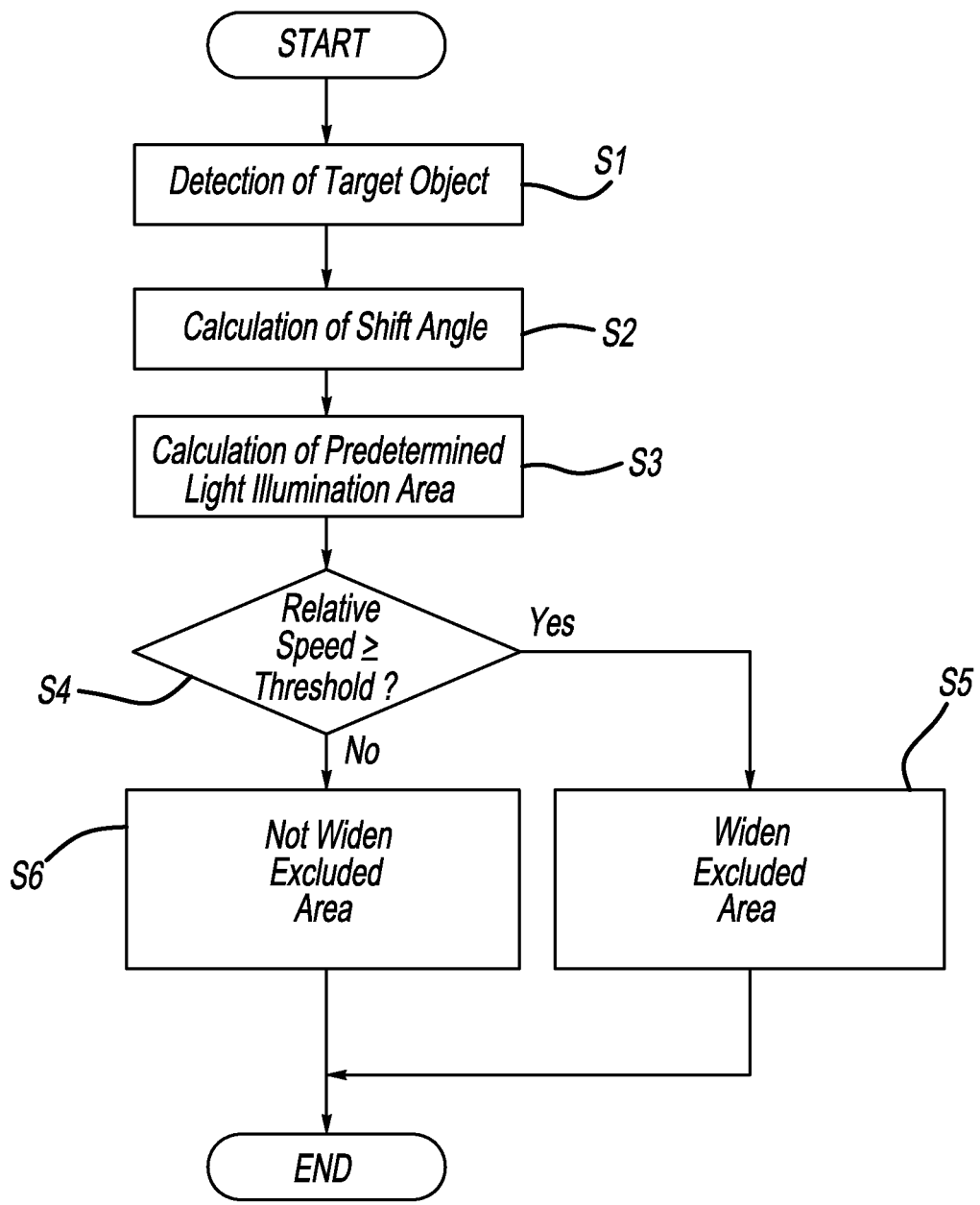
FIG. 12 is a flowchart showing an operation of a vehicle headlight apparatus according to another embodiment of the present invention.
Figure 13:
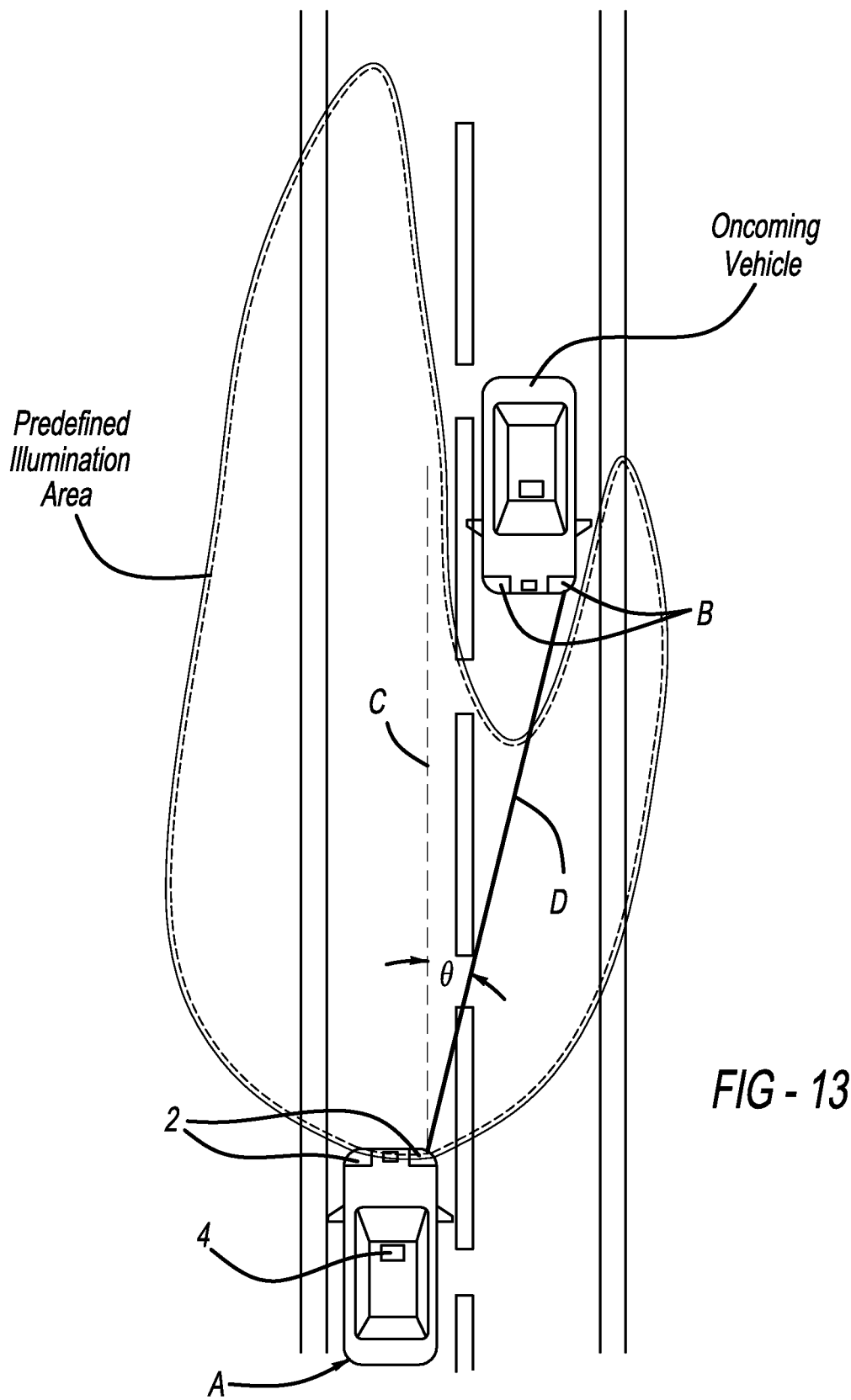
FIG. 13 is a diagram schematically explaining a light illumination area set by the vehicular headlight apparatus according to the embodiment illustrated in FIG. 12.

The vehicular headlight apparatus illustrated in FIGS. 12-13 is designed to widen an area where the target object is present, as excluded from an area to be illuminated by the headlight in an intermediate beam mode.

The ECU 6 performs a program, as illustrated in FIG. 12. Steps S1, S2, and S3 are identical in operation with the ones in FIG. 3.

In step S4, it is determined whether the relative speed of the target object is greater than or equal to a given threshold value or not.

In step S6, the excluded area is not widened in the intermediate beam mode. In step S5, the excluded area is widened in the intermediate beam mode.

Specifically, instead of accelerating the time when the low beam mode is switched from the intermediate beam mode, the system of this embodiment works to widen the excluded area in the intermediate beam mode. For instance, an area around the oncoming vehicle, as illustrated in FIG. 13, is excluded from the light illumination area, as indicated by a solid line, to derive a narrowed area, as indicated by a broken line, when the headlights 2 are in the intermediate beam mode. Specifically, the system excludes a wider area around the target object from the area to be illuminated by the headlights 2 in the intermediate beam mode, thereby reducing the dazzling to the target object (i.e., an oncoming vehicle) which arises from a delay in making the light illumination area follow the target object.

The system is designed to exclude a wider area around the target object from the area to be illuminated by the headlight, thereby reducing the dazzling to the target object (i.e., an oncoming vehicle) which arises from a delay in making the light illumination area follow the target object when the speed of the target object becomes high.

Figure 15:
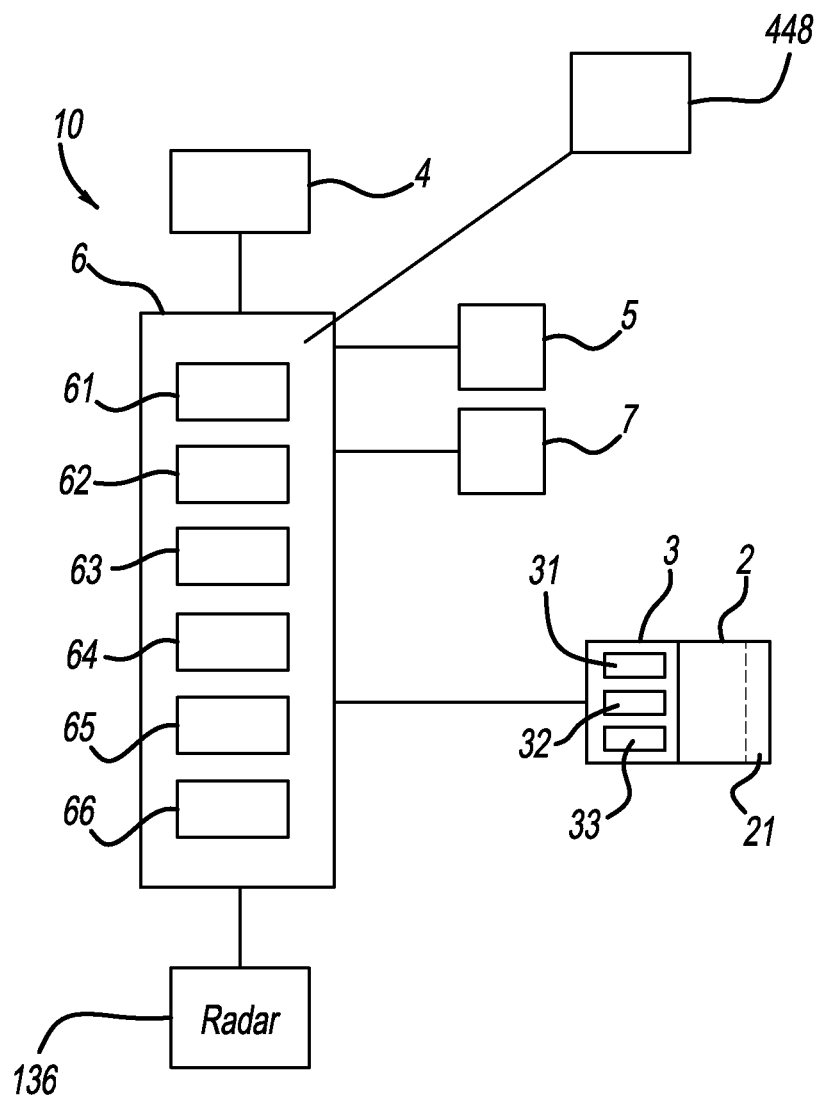
FIG. 15 is a diagram showing the structure of a vehicular headlight apparatus according to another embodiment of the present invention.

In an addition embodiment of the present embodiment, the relative speed detecting means may include a radar 136 such as the radar illustrated in FIG. 15.

Figure 14:
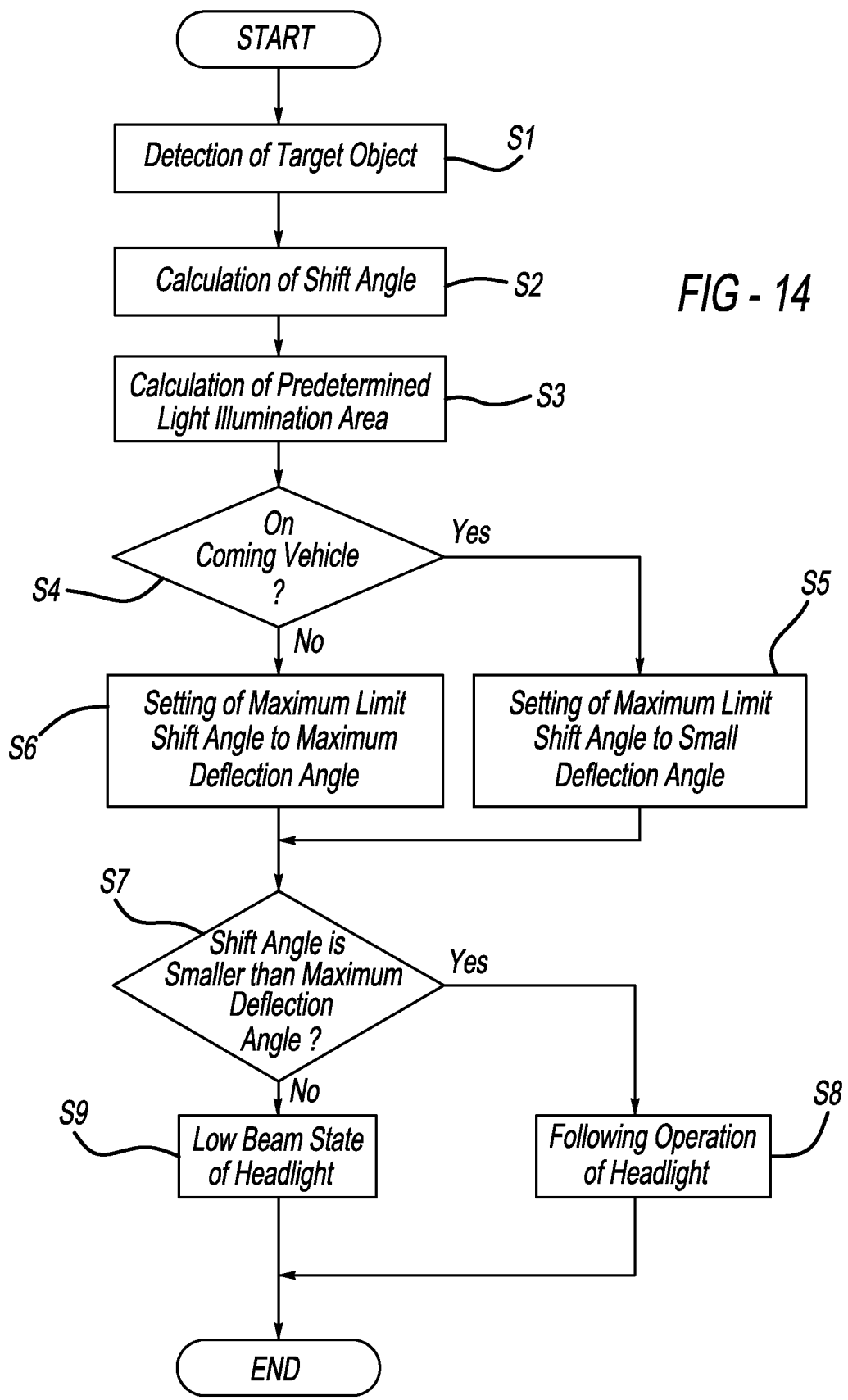
FIG. 14 is a flowchart showing an operation of the vehicular headlight apparatus according to the embodiment illustrated in FIG. 12.

The vehicular headlight apparatus according to another embodiment of the disclosure is illustrated in FIG. 14.

The ECU 6 performs a program, as illustrated in FIG. 14. Only step S4 is different from the one in FIG. 3.

In step S4, it is determined whether the target object is an oncoming vehicle or not. For instance, an image captured by the camera 4 is analyzed using known image analyzing techniques to determine whether the location of a light source of the target object is in an oncoming traffic lane or not, whether the light source is approaching the vehicle A, or whether the color of the light source is white or not. When one of such conditions is met, the ECU 6 may determine that the target object is an oncoming vehicle approaching the vehicle A. The ECU 6 may alternatively use a radar to determine whether the possibility that the target object is an oncoming vehicle is high or not as a function of a change in relative speed of the target object or a change in relative location between the vehicle A and the target object.

If a YES answer is obtained meaning that the target object is the oncoming vehicle, the routine proceeds to step S5. Alternatively, of a NO answer is obtained meaning that the target object is not the oncoming vehicle, the routine proceeds to step S6. When the shift angle is greater than or equal to the maximum limit shift angle (which is the maximum deflection angle or the small deflation angle), the low beam is selected in step S9.

Instead of the shift angle, a parameter indicating the distance to the target object may be used. In this case, when the relative speed is determined to be high, the ECU 6 may work to increase the threshold value for the distance to the target object to be greater than that when the relative speed is low. When the distance to the target object is less than a given threshold value, the ECU 6 may select the low beam mode.

The system is designed to reduce the dazzling to the oncoming vehicle which arises from a delay in making the light illumination area follow the oncoming vehicle whose relative speed usually increases.

The system works to switch a beam mode of the headlight to the low beam mode to narrow the light illumination area earlier than usual, thereby reducing the dazzling to the oncoming vehicle which arises from a delay in making the light illumination area follow the oncoming vehicle.

An additional embodiment of the present disclosure is designed to widen an area where the target object is present, as excluded from an area to be illuminated by the headlight in the intermediate beam mode, as discussed above in relation to FIGS. 12 and 13, instead of accelerating the time when the low beam mode is switched from the intermediate beam mode. In this embodiment, the controlling means excludes an area where the target object is present from an area to be illuminated by the headlight thereby changing the light illumination area. When the target object is determined to be an oncoming vehicle, the control means changes the excluded area to be wider than when the target object is determined not to be an oncoming vehicle.

The system is designed to exclude a wider area around the target object from the area to be illuminated by the headlight, thereby reducing the dazzling to the oncoming vehicle which arises from a delay in making the light illumination area follow the oncoming vehicle.

Figure 16:
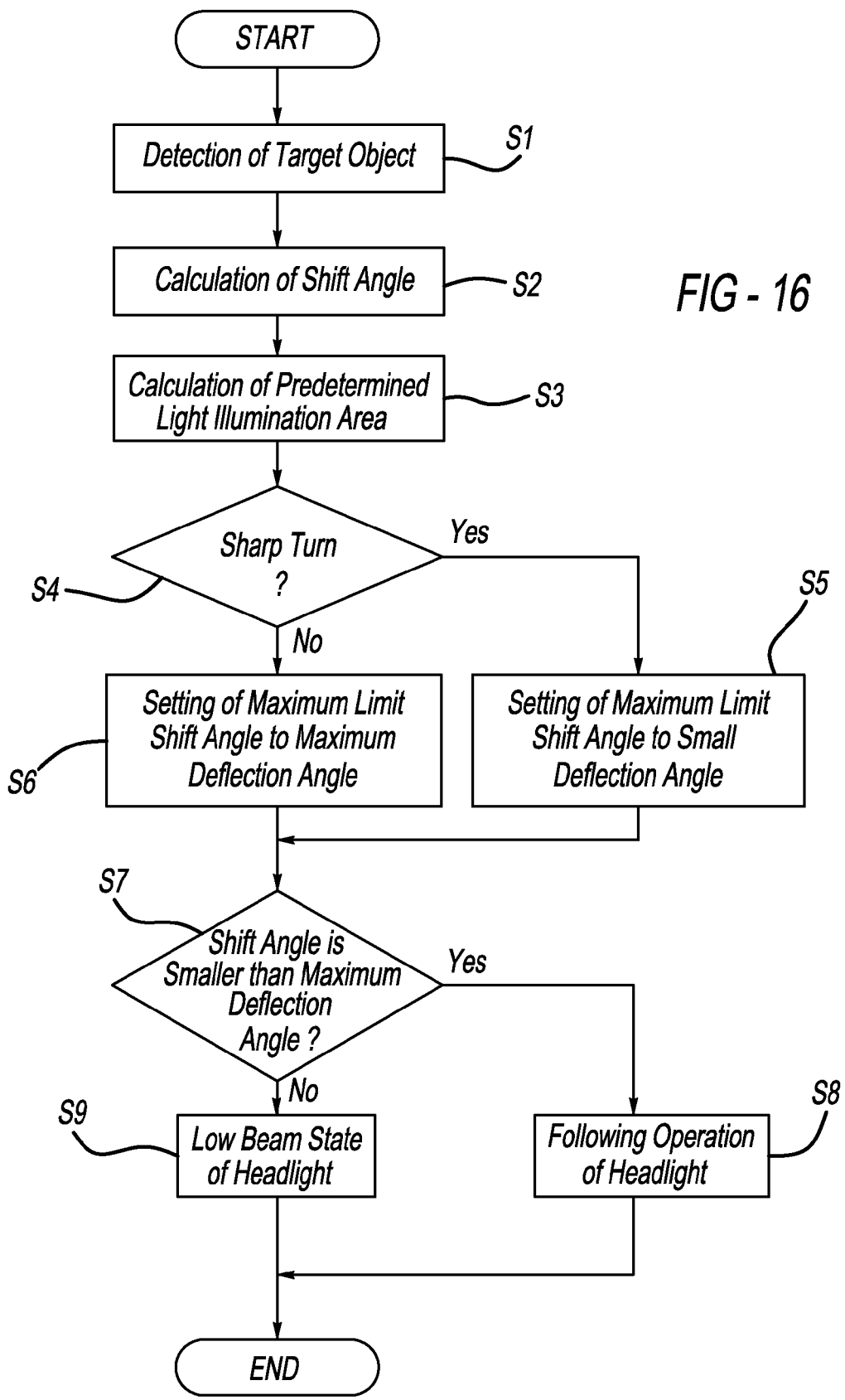
FIG. 16 is a flowchart showing an operation of the vehicular headlight apparatus according to the embodiment illustrated in FIG. 15.

The vehicular headlight apparatus illustrated in FIGS. 15-16 is designed to determine whether the vehicle A is turning sharply or not.

The vehicular headlight apparatus 10 (i.e., the ECU 6) also includes, as illustrated in FIG. 15, a turning condition detecting section 448 which detects a given parameter representing a turning condition of the vehicle A.

The ECU 6 performs a program, as illustrated in FIG. 11. Only step S4 is different in operation from the one in FIG. 3.

In step S4, it is determined whether the vehicle A is turning sharply (steeply) or not. For instance, when an output of a yaw rate sensor installed in the vehicle A is greater than a given threshold value, the ECU 6 determines that the vehicle A is turning sharply. The ECU 6 may alternatively use an output of a steering angle sensor (i.e., the steering angle detecting section 7). Alternatively, an image, as captured by the camera 4, is analyzed using known image analyzing techniques to determine whether a plurality of objects around the vehicle A are moving fast in the same direction or not. If it is determined that the objects are moving fast in the same direction, the ECU 6 may determine that the vehicle A is turning sharply.

If a YES answer is obtained in step S4 meaning that the vehicle A is turning sharply, the routine proceeds to step S5. Alternatively, if a NO answer is obtained, the routine proceeds to step S6.

When the shift angle is greater than or equal to the maximum limit shift angle (which is the maximum deflection angle or the small deflation angle), the low beam is selected in step S9.

Instead of the shift angle, a parameter indicating the distance to the target object may be used. In this case, when the relative speed is determined to be high, the ECU 6 may work to increase the threshold value for the distance to the target object to be greater than that when the relative speed is low. When the distance to the target object is less than a given threshold value, the ECU 6 may select the low beam mode.

Regardless of the shift angle, when the vehicle A is determined to be turning sharply, the ECU 6 may select the low beam mode. For instance, when the vehicle A turns sharply at a traffic intersection, lots of time may be consumed to identify a vehicle present ahead of the vehicle A on a road to which the vehicle A has turned. In such a situation, the ECU 6 operates the headlights 2 in the low beam mode to avoid the dazzling to another vehicle immediately after the vehicle A has turned.

The system is designed to narrow the light illumination area, for example, when the vehicle is turning sharply, thereby reducing the dazzling to the target object (i.e., an oncoming vehicle) which arises from a delay in making the light illumination area follow the target object.

The system works to switch a beam mode of the headlight to the low beam mode to narrow the light illumination area earlier than usual, thereby reducing the dazzling to the target object (i.e., an oncoming vehicle) which arises from a delay in making the light illumination area follow the target object.

The ECU 6 is engineered to widen an area where the target object is present, as excluded from an area to be illuminated by the headlights 2 in the intermediate beam mode as discussed above in relation to FIGS. 12 and 13 instead of accelerating the time when the low beam mode is switched from the intermediate beam mode. The controlling means excludes an area where the target object is present from an area to be illuminated by the headlight, thereby changing the light illumination area, and wherein when the given parameter, as detected by said turning condition detecting means, exceeds the given threshold value, said control means changes the excluded area to be wider than when the given parameter does not exceed the given threshold value.

The system is designed to exclude a wider area around the target object from the area to be illuminated by the headlight, thereby reducing the dazzling to the target object (i.e., an oncoming vehicle) which arises from a delay in making the light illumination area follow the target object.

The ECU 6 is, as illustrated in FIG. 15, equipped with the turning condition detection section 448 such as a yaw rate sensor.

Figure 17:
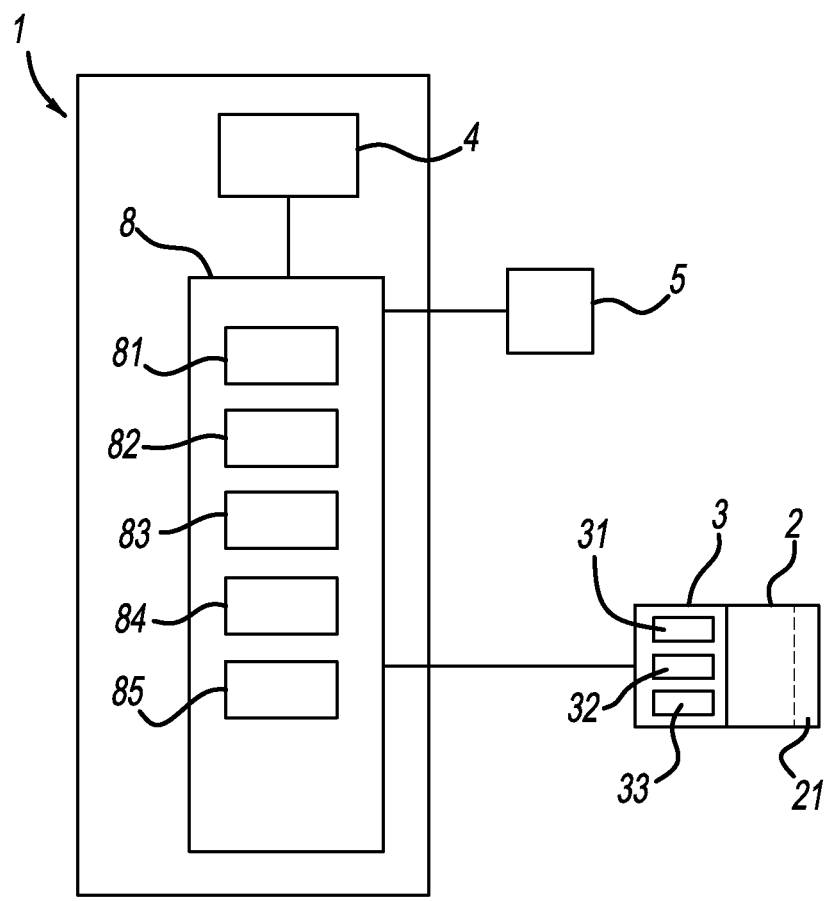
FIG. 17 is a diagram showing the structure of a vehicular headlight apparatus according to another embodiment of the present invention.

Another embodiment of the present disclosure is illustrated in FIG. 17 and it includes a camera apparatus. The camera apparatus includes a camera 4 which is implemented by an image sensor, such as a CMOS imager, to capture an image around the vehicle A. The camera apparatus also includes an ECU 8 which works as a controller to control an operation of the image sensor. The ECU 8 consists of an analyzing section 81, a reference direction determining section 82, a shift angle calculating section 83, a storage section 84, a control section 85.

The camera apparatus is designed to analyze an output from the camera 4 through the ECU 8 to output a high-beam signal, a low-beam signal, a light-shielding pattern which excludes an area around a preceding vehicle or an oncoming vehicle from an area to be illuminated by the headlights 2, and data on a location of a light source in front of the vehicle A.

The embodiment in FIGS. 15 and 17 include a camera apparatus. The camera apparatus includes an analyzing section which works to detect an object that is at least one of a lane on a road, a configuration of the road, a condition of a surface of the road, a retreat area (i.e., a safe area to which the vehicle A is permitted to escape), a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a roadside object, a signboard, a road sign, a traffic signal, an object blocking a view of the camera apparatus, and an environment outside the vehicle A. Specifically, the camera apparatus (i.e., the analyzing section) selects one or some of them required in execution of a vehicle control operation.

For instance, the analyzing section performs a light-source recognizing operation to detect one or some light sources and determines whether the detected light source(s) is a light source of a preceding vehicle (i.e., a tail lamp) or a light source of an oncoming vehicle (i.e., a headlight). This determination may be made using known techniques. For instance, when the detected light source is in a white color range, the analyzing section determines that it is a light source of an oncoming vehicle approaching the vehicle A. Alternatively, when the detected light source is reddish, the analyzing section determines that it is a light source of a preceding vehicle running ahead of the vehicle A. The analyzing section calculates coordinates of the detected light source within the captured image and outputs it along with preceding vehicle/oncoming vehicle data on whether the detected light source arises from the preceding vehicle or the oncoming vehicle to the control section as camera-derived information. The control section analyzes the camera-derived information to switch between the high-beam mode and the low-beam mode and swivel the optical axis of the headlights 2.

The analyzing section also calculates and outputs a location of a white marking on the road. Specifically, the analyzing section performs known white marking detecting operations (e.g., image binary processing and Hough transform) to determine the location of the white marking on the road within the image captured by the camera 4 and outputs data on the location of the white marking to the control section. The control section then analyzes the data to determine the probability that the vehicle A will departure from the lane in which the vehicle A is now running. When such a probability is high, the control section alerts the probability to the driver of the vehicle A.

The control section stores therein control programs which are executed to perform various vehicle control operations using, for example, the headlights 2, the engine, the brakes, and/or the steering wheel. For instance, the control sections performs at least one of a frontal collision avoidance operation, a collision avoidance operation at a traffic intersection, a crossing collision avoidance operation, a speed alerting operation, a lane departure controlling operation, a collision alerting operation, an inter-vehicle gap alerting operation, a lane departure warning operation, an automatic high-beam operation, a sign displaying operation, a full-speed adaptive cruise control operation, a lane-keeping operation, an accident avoidance operation when a lane is changed, a blind spot alerting operation, a blind spot monitoring operation, an automatic lane change operation, a front cross traffic alerting operation, a rear cross traffic alerting operation, a pedal misapplication avoidance operation, and an automatic parking operation.

The camera apparatus may be implemented by a stereo camera.

The stereo camera usually outputs a large amount of image data to the ECU. It takes a long time to process the image, which may result in a delay in following the target object. In order to alleviate such a problem, the camera apparatus regulates the timing of the illumination or an area to be illuminated by the headlights 2 to minimize the dazzling to a vehicle present ahead of the vehicle A.

The camera apparatus can be equipped with a radar to measure the distance to and the relative speed of the target object to identify the target object accurately. When a light source is searched in the captured image, one of objects whose relative speed, as measured by the radar, is the highest is first image-processed, thereby acquiring or tracking the target object quickly. This avoids the dazzling to a vehicle in front of the vehicle A rapidly.

The above explained preferred embodiments are exemplary of the invention of the present application which is described solely by the claims appended below. It should be understood that modifications of the preferred embodiments may be made as would occur to one of skill in the art.

What is claimed is:

1. A vehicular headlight apparatus comprising:
a headlight which illuminates ahead of a vehicle;
means for changing a light illumination area of the headlight;
means for recognizing ahead of the vehicle;
means for calculating a position of a given target object based on data outputted from said recognizing means;
means for detecting a speed of the vehicle; and
means for controlling the changing means, when the given target object is detected, said controlling means working to change the light illumination area through said changing means in order to minimize dazzling to the given target objet based on analysis results derived by said calculating means,
wherein when the speed of the vehicle, as detected by said detecting means, exceeds a given threshold value, said controlling means changes the light illumination area to a low-beam light illumination area earlier than when the speed of the vehicle is lower than the given threshold value; and
wherein the vehicle headlight apparatus has three modes: a high-beam mode, an intermediate beam mode, and a low-beam mode, and a time when the intermediate beam mode is switched to the low-beam mode when the speed of the vehicle is higher than a predetermined value is earlier than that when the speed of the vehicle is lower than the predetermined value.

2. A vehicular headlight apparatus as set forth in claim 1, wherein said analyzing means detects the given target object and calculates positions of the given target object in a vertical direction and a width-wise direction thereof based on the data, as outputted from said recognition means, further comprising: reference direction determining means for determining a reference direction with respect to a direction of light emission of the headlight when the target object is detected; shift angle calculating means for calculating, as a shift angle, an angle between the reference direction and a direction to the target object based on a location where the headlight is mounted; first storage means for storing a maximum deflection angle set to a maximum limit shift angle that is a maximum value of said shift angle for following the target object, wherein when the target object is detected, the control means changes the light illumination area until the shift angle exceeds the maximum deflection angle based on the analysis results derived by said analyzing means in order to follow the target object, further comprising second storage means for storing a small deflection angle smaller than the maximum deflection angle, and wherein the control means is configured to, when the vehicle speed is detected to exceed the given threshold value, set the maximum limit shift angle to the small deflection angle, and change the light illumination area to a low-beam light illumination area covered by the headlight in a low-beam state when the shift angle, as calculated by said shift angle calculating means, has exceeded the small deflection angle.

3. A vehicular headlight apparatus as set forth in claim 1, wherein said analyzing means detects the given target object and calculates a distance to the given target object based on the data, as outputted from said recognition means, and wherein when the target object is detected, said control means changes the light illumination area so as to follow the target object based on the analysis results, as derived by the analyzing means, until the calculated distance drops below a given distance and, when the speed of the vehicle, as detected by said vehicle speed detecting means, exceeds the given threshold value, also increases the given distance to be longer than when the speed of the vehicle does not exceed the given threshold value.

4. A vehicular headlight apparatus as set forth in claim 1, wherein the given target object is an oncoming vehicle.

5. A camera apparatus in combination with a vehicular headlight apparatus equipped with a headlight which illuminates ahead of a vehicle and means for changing a light illumination area of the headlight, comprising:
means for controlling the changing means;
means for recognizing ahead of the vehicle;
means for calculating a position of a given target object based on data outputted from said recognizing means; and
means for detecting a speed of the vehicle,
wherein when the given target object is detected, said controlling means works to change the light illumination area in order to minimize dazzling to the given target objet based on analysis results derived by said calculating means,
wherein when the speed of the vehicle, as detected by said detecting means, exceeds a given threshold value, said controlling means changes the light illumination area to a low-beam light illumination area earlier than when the speed of the vehicle does not exceed the given threshold value; and
wherein the vehicle headlight apparatus has three modes: a high-beam mode, an intermediate beam mode, and a low-beam mode, and a time when the intermediate beam mode is switched to the low-beam mode when the speed of the vehicle is higher than a predetermined value is earlier than that when the speed of the vehicle is lower than the predetermined value.

6. A camera apparatus as set forth in claim 5, wherein the camera apparatus is a stereo camera.

7. A camera apparatus as set forth in claim 5, wherein the vehicular headlight apparatus is equipped with a radar.

8. A camera apparatus in combination with a vehicular headlight apparatus equipped with a headlight which illuminates ahead of a vehicle and means for changing a light illumination area of the headlight, comprising:
means for controlling the changing means;
means for recognizing ahead of the vehicle;
means for calculating a position of a given target object based on data outputted from said recognizing means; and
means for detecting a speed of the vehicle,
wherein said calculating means works to detect an object that is at least one of a lane on a road, a configuration of the road, a road surface condition, a retreat area (i.e., a safe area), a light source, an obstacle, a preceding vehicle, a preceding pedestrian, a preceding object, a stationary vehicle, a stationary pedestrian, a stationary object, an oncoming vehicle, an oncoming pedestrian, an oncoming object, a two-wheeled vehicle, a bicycle, a roadside object, a signboard, a road sign, a traffic signal, an object blocking a view of the camera apparatus, and an environment outside the vehicle,
wherein when the given target object is detected, said controlling means works to change the light illumination area in order to minimize dazzling to the given target objet based on analysis results derived by said calculating means,
wherein said controlling means performs a vehicle control mode that is at least one of a frontal collision avoidance operation, a collision avoidance operation at a traffic intersection, a crossing collision avoidance operation, a speed alerting operation, a lane departure controlling operation, a collision alerting operation, an inter-vehicle gap alerting operation, a lane departure warning operation, an automatic high-beam operation, a sign displaying operation, a full-speed adaptive cruise control operation, a lane-keeping operation, an accident avoidance operation when a lane is changed, a blind spot alerting operation, a blind spot monitoring operation, an automatic lane change operation, a front cross traffic alerting operation, a rear cross traffic alerting operation, a pedal misapplication avoidance operation, and an automatic parking operation, and
wherein when the speed of the vehicle, as detected by said detecting means, exceeds a given threshold value, said controlling means changes the light illumination area to a low-beam light illumination area earlier than when the speed of the vehicle does not exceed the given threshold value; and
wherein the vehicle headlight apparatus has three modes: a high-beam mode, an intermediate beam mode, and a low-beam mode, and a time when the intermediate beam mode is switched to the low-beam mode when the speed of the vehicle is higher than a predetermined value is earlier than that when the speed of the vehicle is lower than the predetermined value.

9. A vehicular headlight apparatus as set forth in claim 1, wherein when an object is detected, the high-beam mode is switched to the intermediate-beam mode regardless of the speed of the vehicle.

10. A vehicular headlight apparatus comprising:
a headlight which illuminates ahead of a vehicle;
means for changing a light illumination area of the headlight;
means for recognizing ahead of the vehicle;
means for calculating a position of a given target object based on data outputted from said recognizing means;
means for detecting a speed of the vehicle; and
means for controlling the changing means, when the given target object is detected, said controlling means working to change the light illumination area through said changing means in order to minimize dazzling to the given target objet based on analysis results derived by said calculating means,
wherein when the speed of the vehicle, as detected by said detecting means, exceeds a given threshold value, said controlling means changes the light illumination area to a low-beam light illumination area earlier than when the speed of the vehicle is lower than the given threshold value; and
wherein said analyzing means detects the given target object and calculates positions of the given target object in a vertical direction and a width-wise direction thereof based on the data, as outputted from said recognition means, further comprising: reference direction determining means for determining a reference direction with respect to a direction of light emission of the headlight when the target object is detected; shift angle calculating means for calculating, as a shift angle, an angle between the reference direction and a direction to the target object based on a location where the headlight is mounted; first storage means for storing a maximum deflection angle set to a maximum limit shift angle that is a maximum value of said shift angle for following the target object, wherein when the target object is detected, the control means changes the light illumination area until the shift angle exceeds the maximum deflection angle based on the analysis results derived by said analyzing means in order to follow the target object, further comprising second storage means for storing a small deflection angle smaller than the maximum deflection angle, and wherein the control means is configured to, when the vehicle speed is detected to exceed the given threshold value, set the maximum limit shift angle to the small deflection angle, and change the light illumination area to a low-beam light illumination area covered by the headlight in a low-beam state when the shift angle, as calculated by said shift angle calculating means, has exceeded the small deflection angle.

11. A vehicular headlight apparatus comprising:
a headlight which illuminates ahead of a vehicle;
means for changing a light illumination area of the headlight;
means for recognizing ahead of the vehicle;
means for calculating a position of a given target object based on data outputted from said recognizing means;
means for detecting a speed of the vehicle; and
means for controlling the changing means, when the given target object is detected, said controlling means working to change the light illumination area through said changing means in order to minimize dazzling to the given target objet based on analysis results derived by said calculating means,
wherein when the speed of the vehicle, as detected by said detecting means, exceeds a given threshold value, said controlling means changes the light illumination area to a low-beam light illumination area earlier than when the speed of the vehicle is lower than the given threshold value; and
wherein said analyzing means detects the given target object and calculates a distance to the given target object based on the data, as outputted from said recognition means, and wherein when the target object is detected, said control means changes the light illumination area so as to follow the target object based on the analysis results, as derived by the analyzing means, until the calculated distance drops below a given distance and, when the speed of the vehicle, as detected by said vehicle speed detecting means, exceeds the given threshold value, also increases the given distance to be longer than when the speed of the vehicle does not exceed the given threshold value.

* * * * *